(12) United States Patent
Li et al.

(10) Patent No.: US 10,183,278 B2
(45) Date of Patent: Jan. 22, 2019

(54) METHOD FOR PREPARING THE NANO-POROUS OXIDE-NOBLE METAL COMPOSITE MATERIAL BY DEOXIDATION

(71) Applicant: SHIJIAZHUANG TIEDAO UNIVERSITY, Shijiazhuang (CN)

(72) Inventors: Guijing Li, Shijiazhuang (CN); Wenjie Feng, Shijiazhuang (CN); Jinxi Liu, Shijiazhuang (CN); Xueqian Fang, Shijiazhuang (CN)

( * ) Notice: Subject to any disclaimer, the term of this patent is extended or adjusted under 35 U.S.C. 154(b) by 0 days.

(21) Appl. No.: 15/626,127

(22) Filed: Jun. 18, 2017

(65) Prior Publication Data

US 2018/0250660 A1 Sep. 6, 2018

(30) Foreign Application Priority Data

Mar. 3, 2017 (CN) .......................... 2017 1 0124757

(51) Int. Cl.
*B01J 21/02* (2006.01)
*B01J 21/06* (2006.01)
(Continued)

(52) U.S. Cl.
CPC ............. *B01J 23/54* (2013.01); *B01J 35/004* (2013.01); *B01J 35/0026* (2013.01);
(Continued)

(58) Field of Classification Search
CPC ... B01J 21/02; B01J 21/06; B01J 23/10; B01J 23/38; B01J 23/42; B01J 23/44; B01J 23/50; B01J 23/52; B01J 23/54; B01J 23/56; B01J 23/63; B01J 23/66; B01J 23/72; B01J 23/745; B01J 23/83; B01J 23/8906; B01J 23/8926; B01J 23/894; B01J 37/0226; B01J 35/0026; B01J 35/0033; B01J 35/004; B01J 35/1057
See application file for complete search history.

(56) References Cited

U.S. PATENT DOCUMENTS 6,603,038 B1 * 8/2003 Hagemeyer ............... B01J 23/38
502/325
6,987,200 B2 * 1/2006 Hagemeyer ............... B01J 23/38
560/245

(Continued)

*Primary Examiner* — Cam N. Nguyen
(74) *Attorney, Agent, or Firm* — W&K IP

(57) ABSTRACT

The present invention discloses a method for preparing the nano-porous oxide-noble metal composite material by deoxidation, comprising dissolving the noble metal ion or fine particles, the oxide salt to be dissolved and the target oxide salt in the pure water in a proportion to form the mixed solution, adding the surface active agent, and stirring magnetically; dropping the precipitant gradually to form the precipitate, stirring for 4 h, separating and cleaning the precipitate, and drying, grinding and calcining at a high temperature; corroding fully and dissolving part of the oxide with an etchant, preserving the noble metal and the target oxide, separating, cleaning, drying at 80° C., and heat treating at a high temperature to obtain the nano-porous oxide-noble metal composite material. The present invention has the technological advantages of simple operation, low energy consumption, environmental protection and suitable for batching, etc.

8 Claims, 4 Drawing Sheets

(51) Int. Cl.
  *B01J 23/10* (2006.01)
  *B01J 23/38* (2006.01)
  *B01J 23/42* (2006.01)
  *B01J 23/44* (2006.01)
  *B01J 23/50* (2006.01)
  *B01J 23/52* (2006.01)
  *B01J 23/54* (2006.01)
  *B01J 23/56* (2006.01)
  *B01J 23/63* (2006.01)
  *B01J 23/66* (2006.01)
  *B01J 23/72* (2006.01)
  *B01J 23/745* (2006.01)
  *B01J 23/83* (2006.01)
  *B01J 23/89* (2006.01)
  *B01J 37/02* (2006.01)
  *B01J 35/00* (2006.01)
  *B01J 35/10* (2006.01)

(52) U.S. Cl.
  CPC ....... *B01J 35/0033* (2013.01); *B01J 35/1057* (2013.01); *B01J 37/0226* (2013.01)

(56) References Cited

U.S. PATENT DOCUMENTS

| | | | |
|---|---|---|---|
| 7,491,675 B2* | 2/2009 | Deevi | A24B 15/28 502/184 |
| 7,569,510 B2* | 8/2009 | Deevi | B01J 23/52 131/331 |
| 7,767,610 B1* | 8/2010 | Coker | H01M 4/926 502/60 |
| 8,236,725 B2* | 8/2012 | Fansler | B01J 23/52 502/183 |
| 8,431,506 B2* | 4/2013 | Neltner | B01J 23/10 502/240 |
| 8,900,420 B2* | 12/2014 | Veeraraghavan | C23C 14/223 204/192.15 |
| 9,029,286 B2* | 5/2015 | Neltner | B01J 23/10 502/240 |
| 9,463,428 B2* | 10/2016 | Beaber | C23C 14/16 |
| 9,636,660 B2* | 5/2017 | Lee, II | B01J 23/30 |
| 2007/0204870 A1* | 9/2007 | Deevi | B01J 23/52 131/331 |
| 2011/0152070 A1* | 6/2011 | Fansler | B01J 23/52 502/183 |

* cited by examiner

METHOD FOR PREPARING THE NANO-POROUS OXIDE-NOBLE METAL COMPOSITE MATERIAL BY DEOXIDATION

CROSS-REFERENCE TO RELATED APPLICATIONS

This application claims priority to Chinese Patent Application No. 201710124757.5 with a filing date of Mar. 3, 2017. The content of the aforementioned applications, including any intervening amendments thereto, are incorporated herein by reference.

TECHNICAL FIELD

The present invention relates to the field of the nano-porous oxide-noble metal composite material, and more particularly to a method for preparing the nano-porous oxide-noble metal composite material by deoxidation.

BACKGROUND OF THE PRESENT INVENTION

The noble metal nanoparticles have excellent catalytic properties, and the porous composite material composed of the noble metal contained in the oxide has many special advantages, such as high thermal stability, large specific surface area, low density, interconnected internal channels and good adsorption and the permeability, other aspects of the sensor, energy storage and conversion, CO catalytic oxidation, and photocatalysis, and have a wide range of applications. The oxide pore walls and noble metal particles can play a better synergy: on the one hand, due to the obstruct by the pore walls of high melting point, the dispersion and thermal stability of the metal nanoparticles are enhanced; on the other hand, the binding surface of the nano-scale oxide and the noble metal can produce a strong interaction effect, which will increase the active points of the composite material and enhance significantly the catalytic performance. Therefore, nano-porous oxide-precious metal composite material have been widely concerned, which are the hot spots of research in recent years.

At present, the methods for preparing the nano-porous oxide-noble metal composite material mainly include the template method and the dealloying method. Using the template method, the porous template is synthesized by chemical means firstly, which is divided into the soft template and the hard template, then the precursor metal ions are infused by impregnation method, the porous template is thermally decomposed by heat treating after drying, to form the porous oxide, and finally the metal particles are loaded in the porous oxide.

Another method for preparing the nano-porous oxide-noble metal composite material is the dealloying method. The dealloying method is essentially the corrosion and decomposition of the alloy, which has become an important method for studying nano-porous metal material at present. The active elements of the alloy containing multiple components are removed during the corrosion, and the remaining inert elements constitute the porous metal structure. The method is simple and suitable for large-scale production. For the preparation of precursor alloys, high temperature melting or electrodeposition, magnetron sputtering and the like can be used, and then it is etched into porous metal structure by the chemical or electrochemical. Recently, the preparation of nano-porous metal composite material containing oxides by the dealloying method has been extensively studied. The oxide element is also retained during the formation of metal porous structure by the design of the appropriate alloy and the use of the corresponding corrosion method. The composite material is formed after heat treatment, and the catalytic activity and thermal stability are significantly enhanced. However, porous composite materials based on rare precious metal are costly and difficult to widely used in some areas. If the low oxide as the matrix, precious metals as the added components, it will be an important development trend which significantly reduces costs under the enhanced catalytic performance.

The dealloying method for preparing the nano-porous oxide includes firstly obtaining porous metal and then oxidizing the porous metal to porous oxide. In another method, some elements do not decompose in the dealloying process, but a part of or all are oxidized to form a porous structure. However, during the the formation of the nano-porous structure, a part of the oxide will be attached to the solid-liquid interface after the formation, preventing the corrosion, while the oxide distribution in the internal is uneven. After the formation of nano-porous oxide and loading it with metal particles, there will be blocking of holes and uneven distribution of metal particles. In addition, in the precursor alloy preparation process, energy consumption is high during the high temperature smelting into the alloy, and the phase structure is complex, or leads to poor pore structure uniformity.

For example, Gao et al. made the dealloying of the melt rapidly quenched Ni—Cu—Mn alloy in ammonium sulfate solution to obtain nano-porous Ni—Mn alloy after the Cu element is dissolved, and then use electrochemical oxidation to form nano-porous oxide-metal composite material. For example again, Ye et al. reported that the element of Al is dissolved during Ti—Mo—Al alloy corroded in the sodium hydroxide solution, and that the remaining elements of Ti and Mo form porous $TiO_2/MoO_x$ complex. If the alloy contains noble metals, the nano-porous oxide-noble metal composite material will be formed after the dealloying.

However, the above methods have some drawbacks, for example, the template synthesis process is complex, time-consuming, requires inert gas protection or vacuum conditions in the reaction process, is not suitable for large-scale production, and needs a large number of organic solvents, causing some pollution to the environment. In addition, if the noble metal particles are loaded by the impregnated method, this "outside to inside" approach will inevitably lead to a part of the holes being blocked, and thus the specific surface areas will decrease significantly. Moreover, the distribution of metal particles is uneven, and the bonding strength of oxide and metal is relatively weak.

SUMMARY OF PRESENT INVENTION

The technical problems solved by the present invention is that the noble metal nanoparticles are formed in-situ in the nano-porous oxide by the method of the decomposition of the oxide precursor, which overcomes the defects such as the low porosity and uneven composition caused by the template method and the dealloying method, and obtains the oxide-based composite material having good uniformity, simple process, good catalytic performance.

The technical solution of the present invention is as follows:

a method for preparing the nano-porous oxide-noble metal composite material by deoxidation, comprising the steps of:

S1: based on the weight components, 0.1243-1.243 parts of the noble metal ions or particles (e.g., silver nitrate, gold nanoparticles), 3.9484-4.5559 parts of the oxide salt to be dissolved (e.g., copper nitrate, etc.), 2.8148-3.7835 parts of the target oxide salt (e.g., cerium nitrate, zirconium nitrate, etc.) are dissolved in 200 ml of ultrapure water to form a mixed solution, and into which 0.2-0.25 parts of the surfactant (PVP) is added, followed by stirring magnetically for 5-10 minutes;

S2: a precipitant is dropped gradually in the mixed solution, forming the precipitation, and continuing to drop until the precipitate is not increasing, and then stirring for 4 h, and the precipitate is centrifuged and washed, is dried at 80-85° C. for 12 h, then grounding it, calcining at 500-800° C. of high temperature for 2 h in the air atmosphere, which forming a variety of oxides complex containing noble metal;

S3: the said complex is sufficiently etched with an etchant, dissolving a part of the oxides, reserving the noble metal and the target oxide, separating and washing it, drying at 80-85° C. and heat treating at 400° C. after complete reaction, to obtain the nano-porous noble metal composite material. The resulting porous composite material is an oxide matrix, and whose noble metal content is 1 to 30 wt %.

Further, in the above solution, the noble metal is silver, gold, platinum and palladium.

Further, in the above solution, the target oxide is cerium oxide, zirconium oxide, titanium oxide, lanthanum oxide and the like.

Further, in the above solution, the dissolved oxide is copper oxide, aluminum oxide, iron oxide and the like.

Further, in the above solution, the surfactant is 2 wt % PVP.

Further, in the above solution, the precipitant is a sodium hydroxide solution, and the sodium hydroxide solution is prepared by dissolving 3 g of sodium hydroxide in 50 ml of ultrapure water.

Further, in the solution, the etchant is selected from the group consisting of dilute hydrochloric acid or dilute sulfuric acid, at a mass concentration of 5-6 wt %.

Further, in the step S3, the XRD analysis phase is used, and if the noble metal participates in the reaction during the etching process, it is necessary to further reduce the noble metal.

Still further, the reducing method is: dispersing the dried powder in a 2 wt % sodium hydroxide solution, and gradually adding 5 wt % of the glucose solution to an excess, reacting for 4 hours, reducing the noble metal involved in the reaction to produce a simple substance of noble metal, and then proceeding cleaning, drying and heat treating at 400° C.

The nano-porous oxide-noble metal composite material prepared by the method of the decomposition of the oxide precursor according to the present invention has the advantages of simple operation, low energy consumption and environmental protection, and is suitable for batching, compared with the conventional template method and the dealloying method. The conventional reagents such as sodium hydroxide are used to subside the metal ions, do not need a lot of organic solvents, which also cause the pollution to the environment; dilute hydrochloric acid, dilute sulfuric acid and the like are used during corrosion, which is simple operation, suitable for batch preparation. The composite material itself is well-homogeneous, and the noble metal particles are formed in-situ in the porous oxide, and the interface strength is high. It is possible to avoid the defects, such as the uneven corrosion by the dealloying method and the clogging of holes and the decrease of the specific surface area and the like by the template method.

DETAILED DESCRIPTION OF PREFERRED EMBODIMENTS

Figure 1:
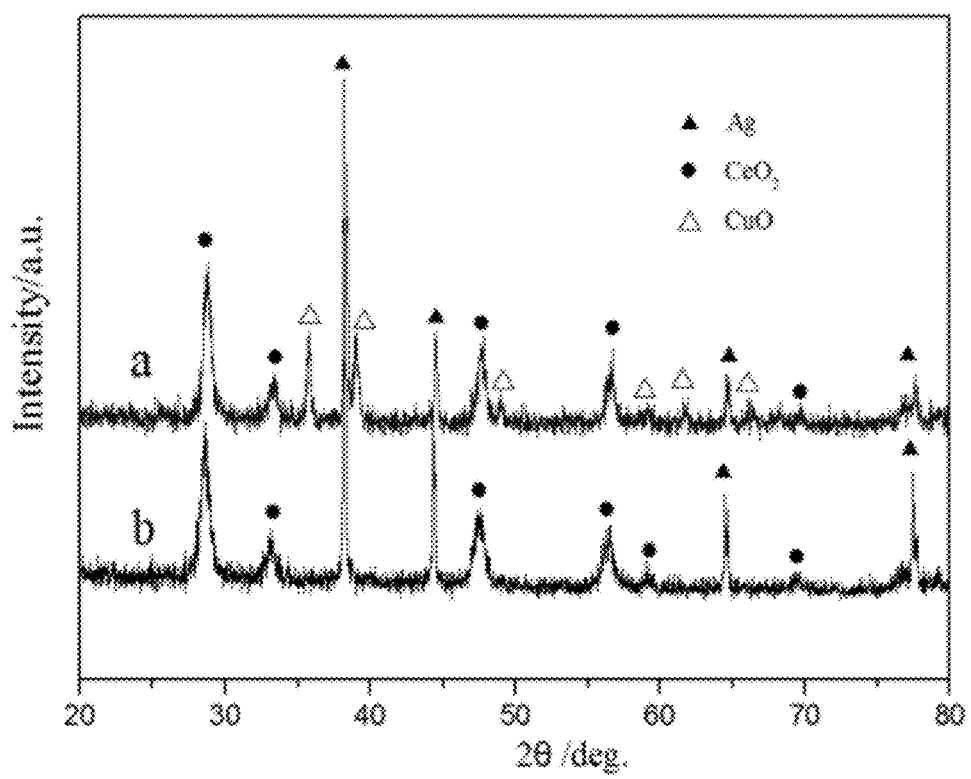
FIG. 1 is XRD spectrums of the complex of $CeO_2$/CuO/Ag before corrosion (a) and after corrosion (b).

The present invention will now be described in further detail with reference to the specific embodiments:

Example 1: Preparing for Nano-Porous $CeO_2$—Ag (5 wt. %) Composite Material 0.1243 g of silver nitrate, 4.5559 g of copper nitrate and 3.7835 g of cerium nitrate were dissolved in 200 ml of ultrapure water to form a mixed solution, and into which 0.2 g of PVP was added, followed by stirring magnetically for 10 minutes. 3 g of sodium hydroxide was dissolved in 50 ml of ultra-pure water to produce a precipitant, which gradually was dropped in the mixed solution, forming the precipitation rapidly, and continued to stir for 4 h. After the precipitate was centrifuged and washed, it was dried at 80° C. for 12 h. And then the dried precipitate was calcined at 500° C. for 2 h in the air atmosphere to obtain the complex of Ag/CuO/$CeO_2$ The complex was sufficiently etched in 5 wt % dilute hydrochloric acid, and the solution gradually became blue. After separating and washing it, the solution was dried at 80° C. (the XRD indicates that the nano-porous cerium oxide-silver chloride complex was formed). The powder was dispersed in the 2 wt % sodium hydroxide solution, and a 5 wt % dextrose solution was added dropwise to cause an excess. After reacting for 4 h, washing, drying and heat treating the powder at 400° C. produced the nano-porous $CeO_2$—Ag (5 wt %) composite material.

Example 2: Preparing for Nano-Porous $CeO_2$—Ag (30 wt. %) Composite Material 0.8772 g of silver nitrate, 3.9484 g of copper nitrate and 3.2791 g of cerium nitrate were dissolved in 200 ml of ultrapure water to form a mixed solution, and into which 0.21 g of PVP was added, followed by stirring magnetically for 10 minutes. 3 g of sodium hydroxide was dissolved in 50 ml of ultra-pure water to produce a precipitant, which gradually was dropped in the mixed solution, forming the precipitation rapidly, and continued to stir for 4 h. After the precipitate was centrifuged and washed, it was dried at 82° C. for 12 h. And then the dried precipitate was calcined at 500° C. for 2 h in the air atmosphere to obtain the complex of Ag/CuO/$CeO_2$ The complex was sufficiently etched in 5.8 wt % dilute hydrochloric acid, and the solution gradually became blue. After separating and washing it, the solution was dried at 82° C. The powder was dispersed in a 2 wt % sodium hydroxide solution, and a 5 wt % dextrose solution was added dropwise to cause an excess. After reacting for 4 h, washing, drying and heat treating the powder at 400° C. produced the nano-porous $CeO_2$—Ag (30 wt %) composite material.

Example 3: Preparing for Nano-Porous $CeO_2$—Ag (10 wt. %) Composite Material 0.2953 g of silver nitrate, 4.559 g of copper nitrate and 3.7835 g of cerium nitrate were dissolved in 200 ml of ultrapure water to form a mixed solution, and into which 0.24 g of PVP was added, followed by stirring magnetically for 10 minutes. 3 g of sodium hydroxide was dissolved in 50 ml of ultra-pure water to produce a precipitant, which gradually was dropped in the mixed solution, forming the precipitation rapidly, and continued to stir for 4 h. After the precipitate was centrifuged and washed, it was dried at 85° C. for 12 h. And then the dried precipitate was calcined at 500° C. for 2 h in the air atmosphere to obtain the complex of $Ag/CuO/CeO_2$ The complex was sufficiently etched in 5.5 wt % dilute hydrochloric acid, and the solution gradually became blue. After separating and washing it, the solution was dried at 85° C. The powder was dispersed in a 2 wt % sodium hydroxide solution, and a 5 wt % dextrose solution was added dropwise to cause an excess. After reacting for 4 h, washing, drying and heat treating the poder at 400° C. produced the nano-porous $CeO_2$—Ag (10 wt %) composite material.

Example 4: Preparing for Nano-Porous $ZrO_2$—Ag (30 wt. %) Composite Material 1.0124 g of silver nitrate, 4.559 g of copper nitrate and 2.8148 g of zirconium nitrate were dissolved in 200 ml of ultrapure water to form a mixed solution, and into which 0.25 g of PVP was added, followed by stirring magnetically for 10 minutes. 3 g of sodium hydroxide was dissolved in 50 ml of ultra-pure water to produce a precipitant, which gradually was dropped in the mixed solution, forming the precipitation rapidly, and continued to stir for 4 h. After the precipitate was centrifuged and washed, it was dried at 85° C. for 12 h. And then the dried precipitate was calcined at 500° C. for 2 h in the air atmosphere to obtain the complex of $Ag/CuO/ZrO_2$. The complex was sufficiently etched in 6 wt % dilute hydrochloric acid, and the solution gradually became blue. After separating and washing it, the solution was dried at 80° C. The powder was dispersed in a 2 wt % sodium hydroxide solution, and a 5 wt % dextrose solution was added dropwise to cause an excess. After reacting for 4 h, washing, drying and heat treating the powder at 400° C. produced the nano-porous $CeO_2$—Zr (30 wt %) composite material.

Example 5: Preparing for Nano-Porous $CeO_2$—Au (3 wt. %) Composite Material 0.1243 g of silver nitrate, 4.5559 g of copper nitrate and 3.7835 g of cerium nitrate weredissolved in 200 ml of ultrapure water to form a mixed solution, and into which 0.21 g of PVP was added, followed by stirring magnetically for 10 minutes. 3 g of sodium hydroxide was dissolved in 50 ml of ultra-pure water to produce a precipitant, which gradually was dropped in the mixed solution, forming the precipitation rapidly, and continued to stir for 4 h. After the precipitate was centrifuged and washed, it was dried at 85° C. for 12 h. And then the dried precipitate was calcined at 500° C. for 2 h in the air atmosphere to obtain the complex of $Ag/CuO/CeO_2$ The complex was sufficiently etched in 5.2 wt % dilute hydrochloric acid, and the solution gradually became blue. After separating and washing it, the solution was dried at 83° C. (the XRD indicates that the porous cerium oxide-silver chloride complex is formed). The powder was dispersed in a 2 wt % sodium hydroxide solution, and a 5 wt % dextrose solution was added dropwise to cause an excess. After reacting for 4 h, washing, drying and heat treating the powder at 400° C. produced the nano-porous $CeO_2$—Ag (5 wt %) composite material. The composite powder was reacted with 0.1% by weight of chloroauric acid and the silver chloride was washed with ammonia to obtain nanoporous CeO2-Au (3 wt. %) Composite.

Example 6: Preparing for Nano-Porous $ZrO_2$—Au (18 wt. %) Composite Material 1.0124 g of silver nitrate, 4.5559 g of copper nitrate and 2.8148 g of zirconium nitrate were dissolved in 200 ml of ultrapure water to form a mixed solution, and into which 0.25 g of PVP was added, followed by stirring magnetically for 10 minutes. 3 g of sodium hydroxide was dissolved in 50 ml of ultra-pure water to produce a precipitant, and which gradually was dropped in the mixed solution, forming the precipitation rapidly, and continued to stir for 4 h. After the precipitate was centrifuged and washed, it was dried at 85° C. for 12 h. And then the dried precipitate was calcined at 500° C. for 2 h in the air atmosphere to obtain the complex of $Ag/CuO/ZrO_2$ The complex was sufficiently etched in 5.5 wt % dilute hydrochloric acid, and the solution gradually became blue. After separating and washing it, the solution was dried at 85° C. The powder was dispersed in a 2 wt % sodium hydroxide solution, and a 5 wt % dextrose solution was added dropwise to cause an excess. After reacting for 4 h, washing, drying and heat treating the powder at 400° C. produced the nano-porous $ZrO_2$—Ag (30 wt %) composite material. The composite powder was reacted with 0.1% by weight of chloroauric acid and the silver chloride was washed with ammonia to obtain nanoporous $ZrO_2$—Au (18 wt. %) Composite.

The XRD spectrums of the complex of $CeO_2/CuO/Ag$ before corrosion (a) and after corrosion (b) are shown in FIG. 1. As can be seen from FIG. 1, the phase structure is CuO—$CeO_2$—Ag complex before corrosion, and mainly containing $CeO_2$ and Ag after corrosion, indicating that the $CeO_2$ based composite material obtained.

Figure 2:
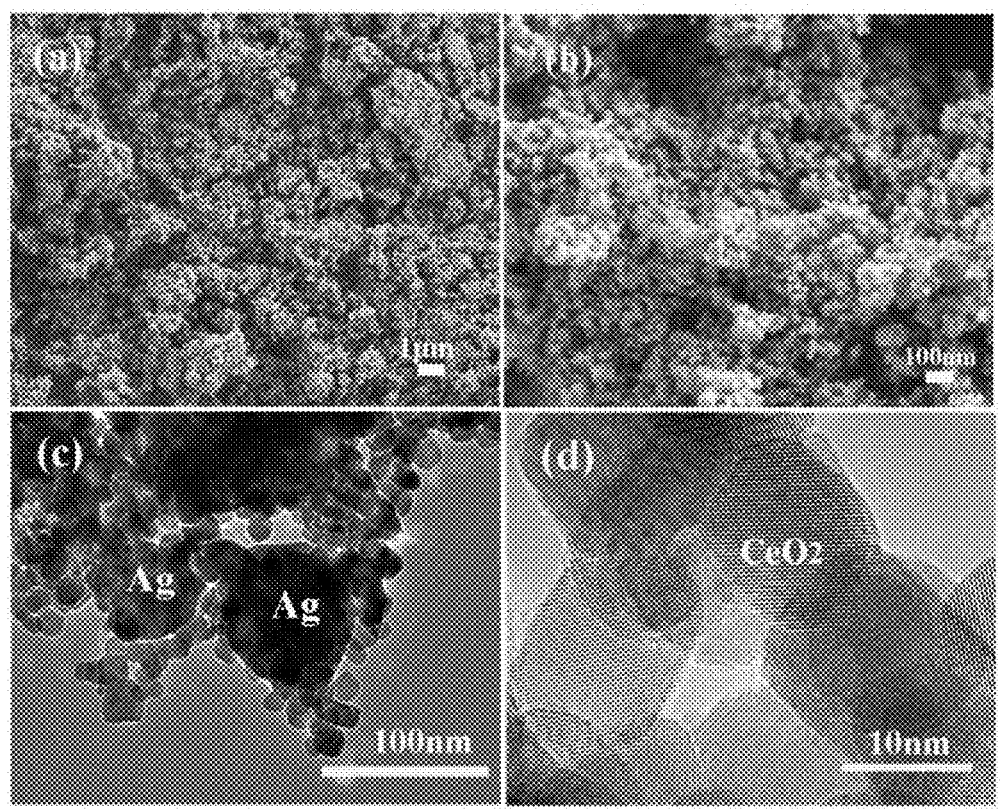
FIG. 2 is a electron photographs of the scanning (a, b) and transillumination (c, d) of the nano-porous $CeO_2$—Ag (5%) composite material prepared according to example 1 of the present invention.

The electron photographs of the scanning (a, b) and transillumination (c, d) of the nano-porous $CeO_2$—Ag (5%) composite material prepared according to example 2 are shown in FIG. 2, wherein 2a and 2b are photographs of different magnification. It can be seen that the material is a homogeneous porous structure and the pore walls are nanoparticles. It can be seen more clearly from the transmitted photographs of FIGS. 2c and 2d that it is the micrographs. Where $CeO_2$ is interconnected to construct a porous structure with 10 nm, the microparticles are of about 10 nm. Wherein the Ag nanoparticles are embedded in the porous structure and have a size of about 60 nm.

Figure 3:
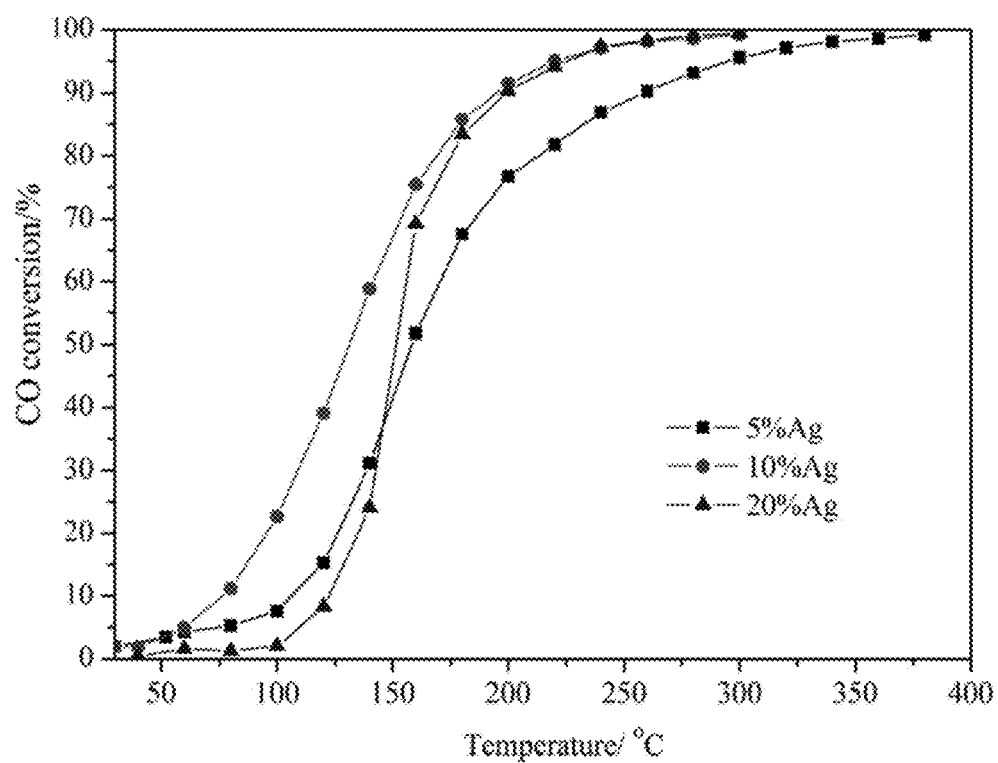
FIG. 3 shows the catalytic oxidation of CO in performance of nano-porous $CeO_2$—Ag composite material with different silver contents.

FIG. 3 shows the catalytic oxidation of CO in performance of nano-porous $CeO_2$—Ag composite material prepared in examples 1, 2 and 3, and from which it can be seen that the catalytic effect is enhanced with the increasing of Ag content, in which the catalytic effect of $CeO_2$—Ag (10 wt. %) is better, and the temperature of 50% conversion is 131 degrees Celsius. But with the further increase in silver content, low temperature catalytic effect is poor, and the high temperature catalytic effect is not different significantly.

Figure 4:
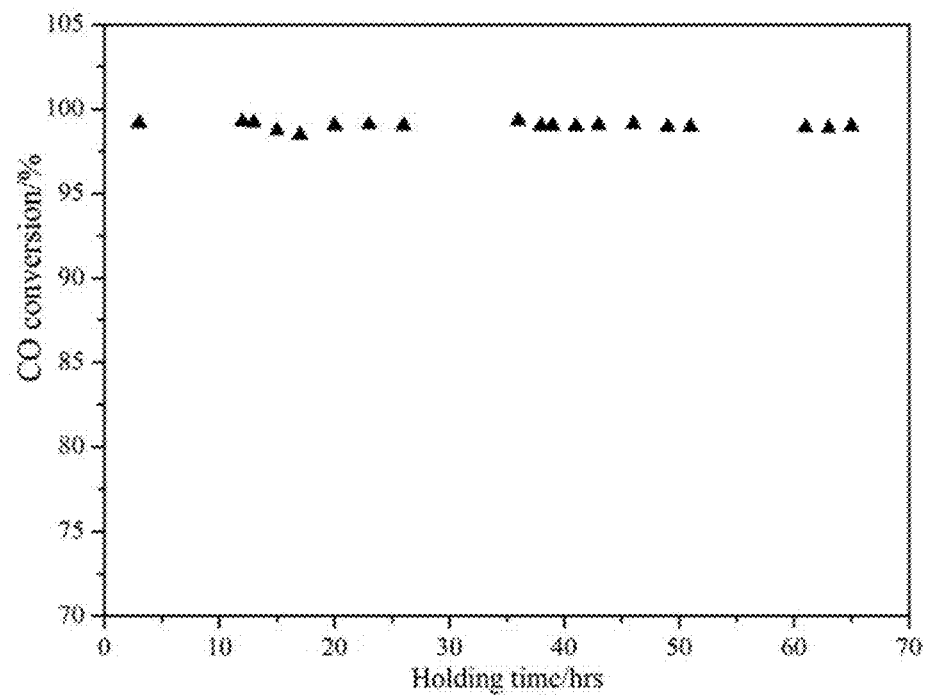
FIG. 4 shows the catalytic oxidation of CO in stable performance of nano-porous $CeO_2$—Ag (10%) composite material with different silver contents for 60 hours.

FIG. 4 shows the catalytic oxidation of CO in stable performance of nano-porous $CeO_2$—Ag (10%) composite material with different silver contents for 60 hours. It can be seen from FIG. 4 that the $CeO_2$—Ag (10 wt. %) material has no attenuation at 300° C. after 65 hours, indicating that the oxide-based noble metal composite material prepared by this method has a good stability.

While many embodiments of the present invention have been described, it is to be understood that within the scope and spirit of the present invention, other embodiments of the invention and/or variations, combinations and substitutions of the present invention may be made are obvious to one of ordinary skills in the art.

We claim:

1. A method for preparing a nano-porous oxide-noble metal composite material by deoxidation, comprising the steps of:
   S1: dissolving 0.1243-1.243 parts (weight component) of noble metal ions or particles, 3.9484-4.5559 parts (weight component) of an oxide salt to be dissolved, 2.8148-3.7835 parts (weight component) of a target oxide salt in 200 ml of ultrapure water to form a mixed solution, adding 0.2-0.25 parts (weight component) of a surfactant, and stirring for 5 to 10 minutes;
   S2: forming a precipitate by adding a precipitant into the mixed solution until the precipitate is not increasing, stirring for about 4 hours, centrifuging and cleaning the precipitate, drying the precipitate at 80-85° C., grounding, and calcining at a temperature of between 500° C. and 800° C. to form an oxide complex containing noble metal;
   S3: etching the oxide complex with an etchant to dissolve a part of the oxides and to preserve the noble metal and the target metal oxide, separating, cleaning, drying at 80-85° C. to form a dried power, heat treating at about 400° C. the oxide complex, to obtain a nano-porous oxide noble metal composite material.

2. The method according to claim 1, wherein the noble metal is silver, gold, platinum or palladium.

3. The method according to claim 1, wherein the target oxide is cerium oxide, zirconium oxide, titanium oxide, or lanthanum oxide.

4. The method according to claim 1, wherein the oxide salt to be dissolved is a salt of copper oxide, aluminum oxide, or iron oxide and the like.

5. The method according to claim 1, wherein the surfactant is 2 wt % PVP.

6. The method according to claim 1, wherein the etchant is selected from the group consisting of dilute hydrochloric acid and dilute sulfuric acid, at a mass concentration of 5-6 wt %.

7. The method according to claim 1, wherein S3 further comprises using an XRD analysis phase, and if the noble metal participates in the reaction during the etching process, reducing the noble metal.

8. The method according to claim 7, wherein reducing the noble metal comprises: dispersing the dried powder in a 2 wt % sodium hydroxide solution, gradually adding 5 wt % of a glucose solution to an excess, reacting for 4 hours, reducing the noble metal involved in the reaction to produce a simple substance of noble metal, and then proceeding with cleaning, drying and heat treating at 400° C.

* * * * *